Figure 1:
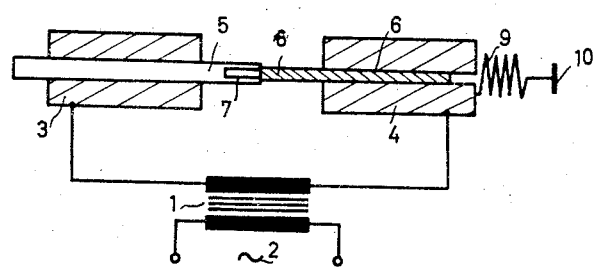

April 21, 1959   F. ZABKA ET AL   2,883,518
METHOD OF WELDING A COPPER WIRE TO AN ALUMINUM BODY
Filed Jan. 6, 1958

Inventors:
Franz Zabka,
Karl Schulze, 2,883,518

METHOD OF WELDING A COPPER WIRE TO AN ALUMINUM BODY

Franz Zabka and Karl Schulze, Heidenheim on the Brenz, Germany, assignors to Siemens & Halske Aktiengesellschaft, Berlin and Munich, Germany, a corporation of Germany Application January 6, 1958, Serial No. 707,287

Claims priority, application Germany January 9, 1957

12 Claims. (Cl. 219—118)

This invention is concerned with a method of welding a copper wire to an aluminum body.

It is known to weld copper wire to aluminum bodies with the blunt end of a wire in abutting engagement with a corresponding aluminum body. The welding heat is thereby produced by an electric current flowing through the copper wire and the aluminum body. The mechanical strength of the welding points produced in this manner has been found unsatisfactory. The object of the invention is to overcome this drawback.

In accordance with the invention, this object is achieved by causing an electric current to flow through an aluminum body and a copper wire to be welded thereto, the end of said wire being forced into and being disposed within a suitable bore provided in the aluminum body.

The method according to the invention comprises the following steps, namely, forming in an aluminum body, to which a copper wire is to be welded, a bore having an inner diameter corresponding approximately to the outer diameter of the copper wire, placing an electrical voltage on the copper wire and on the aluminum body, effecting relative movement of said copper wire and said aluminum body to move the copper wire with its end which is to be welded to the aluminum body in the direction of said bore axially centrally thereof to cause an electric current to flow between the end of said wire and the rim of said bore, thereby heating the end of said wire and the material of said aluminum body in the vicinity of said bore, maintaining said heating to a temperature exceeding the melting point of the material of said aluminum body, thereupon moving said wire into said bore, thereby substantially terminating said heating due to increased spatial distribution of the current flow, and thereafter disconnecting said current.

The current applied is suitably an alternating current such as is produced by the use of customary welding transformers. It is understood, however, that the method according to the invention may also be practiced with direct current. The copper wire, assuming such wire to be the element which is moved with respect to the bore as explained above, need not be moved by hand; a spring biased device may be provided for this purpose. Since there is upon the surface of the aluminum body an oxide layer which must be destroyed by the welding operation, it will be advantageous to make the inner diameter of the bore somewhat smaller than the outer diameter of the copper wire.

In order to avoid formation, during the welding operation, of aluminum oxide, which would adversely affect the mechanical strength of the welding alloy produced, consisting of aluminum bronze, it will be advantageous to carry out the welding in a protective atmosphere of an inert or slightly reducing protective gas. In order to obtain substantially uniform welding, it will be advantageous to heat the aluminum body and also the protective gas by auxiliary heating means.

A particularly strong mechanical bond between the copper wire and the aluminum body is obtained by somewhat widening the end of the copper wire by hammering.

The portions to be welded may be provided with known flux material adapted to alloy with the copper and melting at temperatures which are lower than the temperatures of the aluminum bronze formed in the welding operation.

For the sake of convenience, the invention is being described in connection with welding a copper wire to an aluminum body, the aluminum melting at a temperature which is lower than that of the copper. It will be understood, however, that the invention is also applicable for welding together other metals of respectively different melting points.

The various objects and features of the invention will appear from the description which is rendered below with reference to the accompanying drawing. In the drawing, Fig. 1 shows in schematic manner an example of an arrangement for practicing the invention; and Fig. 2 shows in part sectional, part elevational view, on an enlarged scale, a welding bond between an aluminum pin and a copper wire, produced according to the invention.

Figure 2:
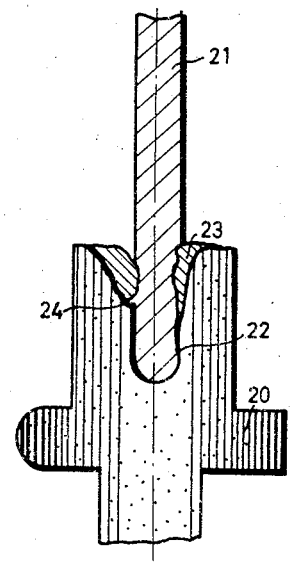

In Fig. 1, numeral 1 indicates a welding transformer with its primary winding connected to a suitable current source 2. The secondary winding of the transformer is connected with two electrodes 3 and 4, such electrodes also serving as chuck means for an aluminum pin 5 and for a copper wire 6, respectively. In the aluminum pin 5 is formed a bore 7 having an inner diameter which is slightly smaller than the outer diameter of the copper wire 6.

A spring 9 resting with one end against a stationary support 10 biases the chuck-electrode 4 and therewith the copper wire 6 axially centrally of the bore 7 in the aluminum pin 5.

A suitable switch (not shown) may be provided for controlling the current supply to the chuck-electrodes 3 and 4.

The welding is effected as described previously.

Numeral 20 in Fig. 2 indicates the aluminum pin and 21 the copper wire which is welded thereto. In the welding operation, the aluminum is alloyed with the copper to form at the rim and for a portion inside of the bore 22 aluminum bronze 23 which adheres to the aluminum of the pin and to the copper wire, bonding these parts firmly together. The diameter of the copper wire is smaller at the rim area of the bore than inside thereof, the alloyed aluminum bronze layer 23 clamping the copper wire firmly in welded position. This feature contributes to the mechanical strength of the bond obtained by the welding according to the invention.

The method according to the invention has been found particularly effective in making electrical and mechanical connections between aluminum pins and electrode leads made of copper wire, in structural elements, especially in the case of miniature electrolytic capacitors with diameters of 5 mm. and less.

Changes may be made within the scope and spirit of the appended claims.

We claim:

1. A method of welding a copper wire to an aluminum body comprising the following steps, namely, forming in the aluminum body a bore with an inner diameter corresponding approximately to the outer diameter of the copper wire, placing an electrical voltage on said aluminum body and on said copper wire, effecting relative motion between said copper wire and said aluminum body to move the copper wire with its end which is to be welded to said aluminum body in the direction of said bore formed in said body and axially centrally of said bore to cause current to flow between the end of said wire and the rim of said bore, thereby effecting heating of the end of said copper wire and of the material of said aluminum body in the vicinity of said bore, maintaining said heating to produce at the corresponding parts a temperature exceeding the melting point of the material of said aluminum body, thereupon driving said wire into said bore and thereby substantially terminating said heating due to increased spatial distribution of the current flowing between the parts, and thereafter disconnecting said current.

2. A method according to claim 1, comprising placing an alternating voltage on said aluminum body and on said copper wire.

3. A method according to claim 1, comprising driving said copper wire into said bore by applying spring pressure thereto.

4. A method according to claim 1, wherein the inner diameter of said bore formed in said aluminum body is somewhat smaller than the outer diameter of said copper wire.

5. A method according to claim 1, comprising effecting said welding in a protective gas atmosphere.

6. A method according to claim 5, comprising separately heating said protective gas atmosphere.

7. A method according to claim 1, comprising separately heating said aluminum body.

8. A method according to claim 1, comprising forming on the end of said copper wire a bead-like rim.

9. A method according to claim 1, comprising placing flux on the parts to be welded together.

10. A method of welding a copper wire to an aluminum body comprising the following steps, namely, forming in the aluminum body a bore with an inner diameter corresponding approximately to the outer diameter of the copper wire, placing an alternating electrical voltage on said aluminum body and on said copper wire, effecting relative motion between said copper wire and said aluminum body to move the copper wire with its end which is to be welded to said aluminum body in the direction of said bore formed in said body and axially centrally of said bore to cause current to flow between the end of said wire and the rim of said bore, thereby effecting heating of the end of said copper wire and of the material of said aluminum body in the vicinity of said bore, maintaining said heating to produce at the corresponding parts a temperature exceeding the melting point of the material of said aluminum body, thereupon driving said wire into said bore by applying spring pressure thereto and thereby substantially terminating said heating due to increased spatial distribution of the current flowing between the parts, and thereafter disconnecting said current.

11. A method of welding a copper wire to an aluminum body in a protective gas atmosphere comprising the following steps, namely, forming in the aluminum body a bore with an inner diameter corresponding approximately to the outer diameter of the copper wire, placing an electrical voltage on said aluminum body and on said copper wire, effecting relative motion between said copper wire and said aluminum body to move the copper wire with its end which is to be welded to said aluminum body in the direction of said bore formed in said body and axially centrally of said bore to cause current to flow between the end of said wire and the rim of said bore, thereby effecting heating of the end of said copper wire and of the material of said aluminum body in the vicinity of said bore, also separately heating said protective gas atmosphere, maintaining said heating to produce at the corresponding parts a temperature exceeding the melting point of the material of said aluminum body, thereupon driving said wire into said bore and thereby substantially terminating said heating due to increased spatial distribution of the current flowing between the parts, and thereafter disconnecting said current.

12. A method of welding a copper wire to an aluminum body comprising the following steps, namely, forming in the aluminum body a bore with an inner diameter corresponding approximately to the outer diameter of the copper wire, forming on the end of said copper wire a bead-like rim, placing flux on contiguous portions of said copper wire and aluminum body being welded together, placing an electrical voltage on said aluminum body and on said copper wire, effecting relative motion between said copper wire and said aluminum body to move the copper wire with its end which is to be welded to said aluminum body in the direction of said bore formed in said body and axially centrally of said bore to cause current to flow between the end of said wire and the rim of said bore, thereby effecting heating of the end of said copper wire and of the material of said aluminum body in the vicinity of said bore, maintaining said heating to produce at the corresponding parts a temperature exceeding the melting point of the material of said aluminum body, thereupon driving said wire into said bore and thereby substantially terminating said heating due to increased spatial distribution of the current flowing between the parts, and thereafter disconnecting said current.

References Cited in the file of this patent
UNITED STATES PATENTS

| | | |
|---|---|---|
| 347,141 | Thomson | Aug. 10, 1886 |
| 1,142,241 | Ellinger | June 8, 1915 |
| 1,292,037 | Pfanstiehl | Jan. 21, 1919 |
| 1,636,656 | Capicotto | July 19, 1927 |
| 1,716,614 | Bergman | June 11, 1929 |
| 2,114,837 | Gillette | Apr. 19, 1938 |